(No Model.)
R. P. THOMPSON.
STEERING GEAR FOR TRACTION ENGINES.
No. 374,016. Patented Nov. 29, 1887.
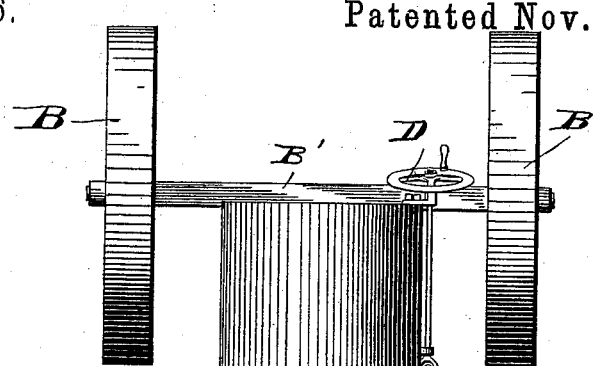
Fig. 1
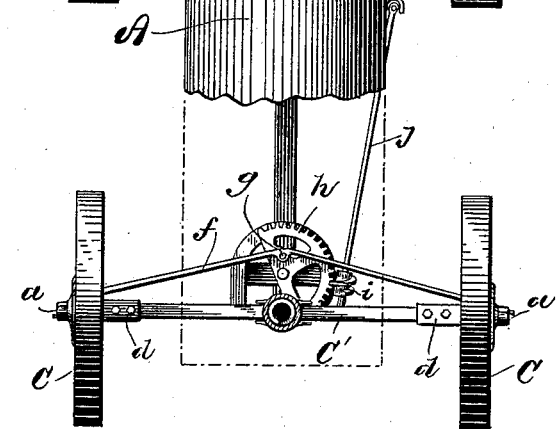
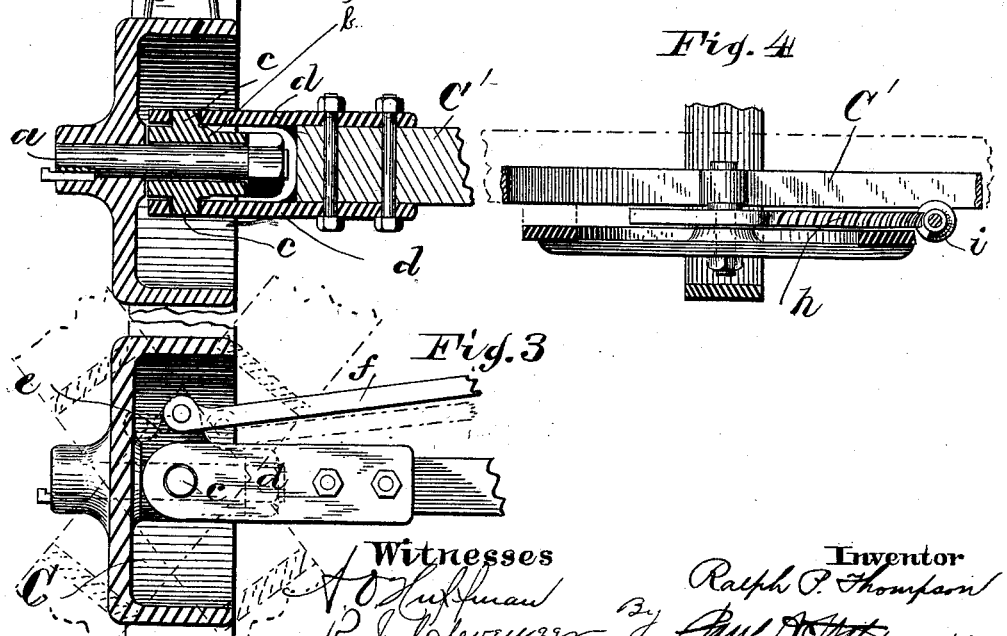
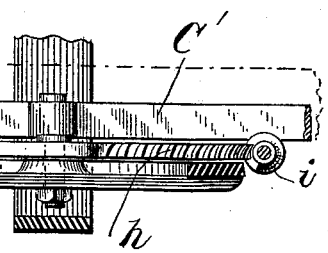
Witnesses
Inventor
Ralph P. Thompson

UNITED STATES PATENT OFFICE.

RALPH P. THOMPSON, OF SPRINGFIELD, OHIO.

STEERING-GEAR FOR TRACTION-ENGINES.

SPECIFICATION forming part of Letters Patent No. 374,016, dated November 29, 1887.

Application filed June 15, 1887. Serial No. 241,332. (No model.)

*To all whom it may concern:*

Be it known that I, RALPH P. THOMPSON, a citizen of the United States, residing at Springfield, in the county of Clark and State of Ohio, have invented certain new and useful Improvements in Steering-Gear for Traction-Engines or other Vehicles, of which the following is a specification.

My invention relates to improvements in the steering-gear of traction-engines or similar vehicles.

The object of my invention is to provide a novel arrangement of the steering-wheels in connection with the axle in a traction-engine or other vehicle, so that the power required to turn the said wheels in changing direction is reduced to the minimum, the arrangement at the same time being simple, strong, and not liable to become disarranged or get out of repair. I accomplish this object by providing the steering-wheels each with a short axle or spindle, which is secured in or connected with the said wheel so as substantially to form a part thereof, the said axle or spindle being journaled in a pivoted or swiveled bearing attached to the main axle and adapted to project into the hub of the wheel, which is recessed for this purpose, so that the center of the pivot or journal on which the said bearing is adapted to turn is located within the space inclosed by the periphery of the wheel, preferably in the center thereof.

My invention consists in the constructions and combinations hereinafter described and claimed.

In the accompanying drawings, which form a part of this specification, Figure 1 is a plan view of a traction-engine, having part of the boiler broken away, to which my invention has been applied. Fig. 2 is a vertical sectional view of a portion of the axle and one of the steering-wheels, showing the manner of attaching the same; and Fig. 3 is a horizontal sectional view of the same. Fig. 4 is a front elevation view of a portion of the main axle, showing the manner of connecting the steering-gear thereto and of communicating motion to the respective wheels.

Like parts are indicated by similar letters of reference throughout the several views.

In the said drawings, A represents the boiler of an ordinary traction engine. B B are the driving-wheels, and C C the steering-wheels.

The rear or driving wheels, B B, are journaled on the rear axle, B', in the ordinary manner, and any suitable well-known mechanism may be employed for transmitting motion thereto from the engine.

The front axle, C', instead of being pivoted in the center and adapted to turn at an angle to the boiler when it is desired to change direction in the advance of the engine, is secured rigidly in place across the engine and parallel with the rear axle, B'. Now in order to provide for readily and quickly changing direction in the course of the engine I connect the steering-wheels C C to the front axle, C', by means of short axles or spindles $a$ $a$, adapted to turn in pivoted bearings, and provide means for connecting the said shafts or spindles or their bearings with the ordinary hand-wheel, D. In order to secure a strong and at the same time a flexible connection without materially increasing the size of the axle at this point, I secure the spindles $a$ $a$ rigidly in the wheels C C and provide a bearing, $b$, for each of said spindles, which bearings are each provided with trunnions $c$ $c$, adapted to turn in bearings in connecting-plates $d$ $d$, secured to the main axle C'. Each of the pivoted bearings $b$ is provided at one side with a projecting arm, $e$, to which are secured the respective ends of a connecting-bar, $f$, which is journaled at its center on a projecting stud, $g$, on the upper side of a horizontally-placed worm-wheel, $h$, which is supported in a suitable bearing at the forward end of the engine under the boiler, and preferably just in the rear of the front axle. A worm, $i$, engaging with the said worm-wheel and connected by a suitable shaft-connection, $j$, to the hand-wheel D, serves to impart a rotary motion to the said wheel $h$, which, through the medium of the connecting-bar $f$ and the projecting arms $e$ $e$, turns the bearings $b$ $b$ on their trunnions, thus moving the wheels C C at an angle to the line of advance, causing the engine to change direction.

In order to lessen the labor required to move the steering-wheels and to cause the engine to change direction quickly, it is desirable that the change in the angular position of the wheels with reference to the line of advance be accomplished without any backward or forward movement of the said wheels. This I accomplish by placing the pivoted bearings $b\ b$ within the space inclosed by the periphery of the said wheels, the center of the trunnions $c\ c$ on said bearings being preferably located in a vertical plane passing through the center of the periphery of the said wheels. It will be seen that by this construction I am enabled to readily turn the steering-wheels to any desired angle without any backward or forward movement thereof, the change in direction of the engine or other vehicle being consequently accomplished with less labor on the part of the operator and much quicker than when the axle is pivoted in the center or without the periphery of the wheels.

As before stated, the short axles or spindles $a\ a$ are secured rigidly in the hubs of the respective wheels, and, if desired, they may be cast in one piece therewith. The hubs of the said wheels are preferably recessed to permit the axle C and the pivoted bearings $b\ b$ to project into the same, so that the said bearings and connections are completely inclosed thereby.

The projecting stud $g$ in the worm-wheel $h$, on which the connecting-bar $f$ is journaled, is located at a distance from the center of the said worm-wheel equal to the distance from the center of the respective trunnions $c\ c$ to the point of connection between the projecting arms $e\ e$ and the connecting-bar $f$, so that the steering-gear turns equally free in any position of the wheels.

In describing my invention I have treated it as applied to traction-engines only, though it is obvious that it may be applied to other vehicles or devices to which it is adapted, with perhaps slight modifications, and secure equally as good results. The constructions of the various parts may be modified in different ways that will readily suggest themselves to the mind of an ordinary mechanic, the operation and results being substantially the same.

I do not therefore confine myself to the exact constructions and arrangement described, but claim as my invention—

1. The combination, with the main axle, of the pivoted bearings attached thereto and provided with projecting arms, the wheels having projecting spindles, forming substantially a part thereof, adapted to turn in said bearings, and means, substantially as set forth, for connecting said projecting arms to the steering mechanism, substantially as specified.

2. The combination, with the main axle and the steering-wheels, of the short axle or spindle secured to said wheels, a sleeve or bearing adapted to receive said spindle and support the same so that it may revolve therein, said sleeve or bearing being provided with trunnions adapted to turn in suitable bearings on the main axle, and means, substantially as described, for connecting the said bearings or sleeves to the steering mechanism, substantially as specified.

3. The combination, with the main axle and the wheels attached thereto, the said wheels being provided with spindles adapted to revolve in pivoted bearings on said main axle, of projecting arms on said pivoted bearings, a connecting-bar pivoted at either end to the respective projecting arm and journaled at the center on a projecting stud in a worm-wheel, the said stud and the respective points of connection with the said arms being adapted to describe arcs of circles of equal radii, a worm engaging said worm-wheel, and means for revolving said worm, substantially as set forth.

4. The combination, with the main axle and the steering-wheels, of the pivoted sleeves or bearings on said axle, spindles secured to said wheels adapted to revolve in said bearings, recessed hubs for said wheels adapted to project over and cover said bearings, the projecting arms, connecting-bar, worm-gear, shaft-connection $j$, and hand-wheel D, substantially as and for the purpose set forth.

In testimony whereof I have hereunto set my hand this 7th day of June, A. D. 1887.

RALPH P. THOMPSON.

Witnesses:
PAUL A. STALEY,
P. J. CLEVENGER.